United States Patent
Sayre et al.

(10) Patent No.: US 8,267,001 B2
(45) Date of Patent: Sep. 18, 2012

(54) COMPOSITE ARMOR AND METHOD FOR MAKING COMPOSITE ARMOR

(75) Inventors: Jay Sayre, New Albany, OH (US); Scott Versluis, Dublin, OH (US); Kary Valentine, Mars, PA (US)

(73) Assignee: Battelle Memorial Institute, Columbus, OH (US)

( * ) Notice: Subject to any disclaimer, the term of this patent is extended or adjusted under 35 U.S.C. 154(b) by 117 days.

(21) Appl. No.: 12/517,397

(22) PCT Filed: Dec. 4, 2007

(86) PCT No.: PCT/US2007/086353
§ 371 (c)(1),
(2), (4) Date: Jun. 3, 2009

(87) PCT Pub. No.: WO2008/130451
PCT Pub. Date: Oct. 30, 2008

(65) Prior Publication Data
US 2010/0043630 A1  Feb. 25, 2010

Related U.S. Application Data

(60) Provisional application No. 60/868,371, filed on Dec. 4, 2006.

(51) Int. Cl.
*F41H 5/02* (2006.01)
(52) U.S. Cl. ............ 89/36.02; 89/903; 89/906; 89/908
(58) Field of Classification Search ...... 89/36.01–36.17, 89/903, 906, 908; 428/911
See application file for complete search history.

(56) References Cited

U.S. PATENT DOCUMENTS

| 4,307,140 | A | * | 12/1981 | Davis ............................. 428/86 |
| 4,403,012 | A | * | 9/1983 | Harpell et al. ................ 442/135 |
| 4,739,690 | A | | 4/1988 | Moskowitz |
| 4,836,084 | A | | 6/1989 | Vogelesang et al. |
| 4,911,061 | A | | 3/1990 | Pivitt et al. |
| 5,006,293 | A | | 4/1991 | Hartman et al. |
| 5,084,510 | A | * | 1/1992 | Braden et al. .................. 525/66 |
| 5,254,383 | A | | 10/1993 | Harpell et al. |

(Continued)

FOREIGN PATENT DOCUMENTS

JP  56053168 A  *  5/1981

(Continued)

OTHER PUBLICATIONS

International Search Report dated Nov. 26, 2008 for Application No. PCT/US2007/086353.

(Continued)

*Primary Examiner* — Michael Carone
*Assistant Examiner* — Joshua Freeman
(74) *Attorney, Agent, or Firm* — Frost Brown Todd LLC

(57) ABSTRACT

A composite armor panel and a method for making the armor is disclosed. In one embodiment the armor consists of a plurality of ceramic tiles (21) individually edge-wrapped (52) with fiber or edge-wrap fabric, which are further wrapped with a face-wrap fabric, and encapsulated in a hyperelastic polymer material (31) permeating the fabric and fibers, with a back plate (41) adhered to the encapsulated tiles. In one embodiment the hyperelastic polymer (31) is formed from a MDI-polyester or polyether prepolymer, at lease one long-chain polyester polyol comprising ethylene/butylene adipate diol, at least one short-chain diol comprising 1,4-butanediol, and a tin-based catalyst.

29 Claims, 6 Drawing Sheets

U.S. PATENT DOCUMENTS

| | | | | |
|---|---|---|---|---|
| 5,349,893 | A | * | 9/1994 | Dunn .................. 89/36.05 |
| H0001567 | H | * | 8/1996 | Parsons et al. ........ 89/36.02 |
| 5,554,816 | A | * | 9/1996 | Skaggs et al. ......... 89/36.17 |
| 5,591,933 | A | | 1/1997 | Li et al. |
| 5,635,288 | A | * | 6/1997 | Park .................... 428/105 |
| 5,705,764 | A | * | 1/1998 | Schade et al. ......... 89/36.02 |
| 5,962,120 | A | * | 10/1999 | Keipert ................ 428/317.9 |
| 6,035,438 | A | | 3/2000 | Neal et al. |
| 6,253,655 | B1 | | 7/2001 | Lyons et al. |
| 6,332,390 | B1 | | 12/2001 | Lyons |
| 6,510,777 | B2 | | 1/2003 | Neal |
| 6,532,857 | B1 | | 3/2003 | Shih et al. |
| 6,564,448 | B1 | * | 5/2003 | Oura et al. ............. 29/830 |
| 6,601,497 | B2 | | 8/2003 | Ghiorse et al. |
| 6,745,661 | B1 | | 6/2004 | Neal et al. |
| 6,811,877 | B2 | | 11/2004 | Haislet et al. |
| 7,300,893 | B2 | * | 11/2007 | Barsoum et al. ........ 442/134 |
| 7,685,922 | B1 | * | 3/2010 | Martin et al. .......... 89/36.02 |
| 7,762,175 | B1 | * | 7/2010 | Bhatnagar et al. ...... 89/36.02 |
| 7,861,638 | B1 | * | 1/2011 | Percival et al. ........ 89/36.02 |
| 7,866,248 | B2 | * | 1/2011 | Moore et al. .......... 89/36.02 |
| 2002/0178900 | A1 | * | 12/2002 | Ghiorse et al. ........ 89/36.02 |
| 2005/0004306 | A1 | * | 1/2005 | Lubnin et al. ......... 524/589 |
| 2007/0132914 | A1 | * | 6/2007 | Takahashi et al. ...... 349/61 |
| 2008/0125535 | A1 | * | 5/2008 | Wang et al. ........... 524/445 |
| 2010/0233146 | A1 | * | 9/2010 | McDaniel ............. 424/94.2 |

FOREIGN PATENT DOCUMENTS

| | | | |
|---|---|---|---|
| JP | 02091128 A | * | 3/1990 |
| WO | WO 91/07632 | | 5/1991 |
| WO | WO 91/07633 | | 5/1991 |

OTHER PUBLICATIONS

International Preliminary Report on Patentability dated Jun. 10, 2009 for Application No. PCT/US2007/086353.

Office Action dated Jan. 13, 2011 for Application No. EP 07874517.

* cited by examiner

COMPOSITE ARMOR AND METHOD FOR MAKING COMPOSITE ARMOR

CROSS REFERENCE TO RELATED APPLICATIONS

The present application hereby claims the benefit of the provisional patent application of the same title, Ser. No. 60/868,371, filed on Dec. 4, 2006, the disclosure of which is hereby incorporated by reference in its entirety.

BACKGROUND OF THE INVENTION

The present invention relates, in general, to a composite armor and a process for forming a composite armor.

Composite armor containing ceramics and high strength fibers have been useful to provide protection against ballistic projectiles. Typical existing armor for vehicles use rigid plates of steel. However they have the disadvantage of being very heavy. Ceramic containing armor systems have demonstrated great promise as reduced weight armors. These armor systems function efficiently by shattering the hard core of a projectile during impact on the ceramic material. The lower velocity bullet and ceramic fragments produce an impact, over a large "footprint", on a backing plate which supports the ceramic plates. The large footprint enables the backing plate to absorb the incident kinetic energy without being breached.

Most studies of ceramic armors have only investigated single-hit conditions. Interest in ceramic armors that can protect against multiple hits over small areas of the armor has been growing.

The challenge to developing multi-hit ceramic armor is to control the damage created in the ceramic plates and the backing plate by the impact. The ability to defeat subsequent hits that are proximate to previous hits can be degraded by (1) damage to the ceramic or backing around a prior hit and/or (2) loss of backing support of tile through backing deformation. Early in the impact event, this damage can be created by stress wave propagation from the impact site. Later in the event, the entire armor panel becomes involved with a dynamic excitation from the threat impulse, vibrating locally at first and later the entire panel moving in a fashion similar to a drumhead. This later response of the panel to the threat impulse can cause further damage to the armor system, often remote from the impact site. The later time excitation of the panel is dependent on the support or attachment conditions of the panel. Hence, the development of multi-hit ceramic armors requires consideration of the panel size and the support condition of the panel.

The lateral displacement of ceramic debris during the fracturing of an impacted tile can also damage the adjacent tiles, reducing their capability to defeat a subsequent projectile impact. An impact may induce bending waves in the backing material. These bending waves can cause (1) permanent plastic deformation of the backing plate which degrades the support of adjacent tiles, (2) bending fracture of adjacent ceramic tiles, or (3) eject the ceramic tiles from the backing plate.

Encapsulation of the ceramic tiles in a polymer allows multiple ceramic tiles to be laid out in a matrix to make a larger panel. The panels may be laid out as in U.S. Pat. No. 6,532,857 or an imbricated layout as in U.S. Pat. No. 6,510,777. Furthermore viscoelastic polymers attenuate stress waves created by the impact. Unlike metals or ceramics, elastomers can undergo time dependent, recoverable deformations without mechanical failure. They can be stretched 5 to 10 times their original length and, after removal of the stress, retract rapidly to near their original dimensions with no induced damage. By using elastomer-encapsulation around the ceramic tiles, the ceramic damage zone can usually be limited to the impacted tile. Impacts near to the edge of a tile may produce some damage in the immediately adjacent tile. In the tile array, lateral self-confinement in the impacted tile is created by the surrounding tiles. This self-confinement enhances the resistance to penetration by increasing the "friction" between the projectile and the fragmented rubbles.

Woven cloth made from high strength fibers such as polyamide plastic or aluminosilicate glass fibers, has been used to wrap the ceramic tiles as show in U.S. Pat. No. 4,911,061 and U.S. Pat. No. 5,006,293. The wrapped cloth spaces the tiles from each other to prevent shock generated by an impacting projectile from propagating from one tile to the next.

Despite these advances in composite ceramic armor, a significant need exists to reduce cost and weight of composite ceramic armor systems while maintaining single-hit performance and improving multi-hit performance. Weight and cost reduction is accomplished through design optimization of cost-effective materials. For improving multi-hit performance, one needs to reduce damage of neighboring tiles. This is done by reducing stress wave propagation; lateral and through-the-thickness displacement of ceramic fragments and rubble in front of the impacting projectile; and de-lamination and deflection of the backing plate.

BRIEF SUMMARY OF THE INVENTION

The invention overcomes the above-noted and other deficiencies of the prior art by providing a strike face comprising, one or more ceramic tiles individually wrapped with a permeable medium, and a hyperelastic polymer material permeating the permeable medium encapsulating the tiles.

The use of the strike face of the present invention attached to a back plate forms a composite armor panel that has single hit performance, multi-hit performance, is light weight, and inexpensive to manufacture. The multi-hit performance is achieved by reducing the stress wave propagations, lateral and through-the-thickness displacement of ceramic fragments, and delamination and deflection of the backing plate, during and after a ballistic impact.

Another aspect of the invention is the method of making a strike face comprising, wrapping one or more ceramic tiles individually in a permeable medium, and encapsulating the tiles and permeable medium in a hyperelastic polymer which permeates the permeable medium.

These and other objects and advantages of the present invention shall be made apparent from the accompanying drawings and the description thereof.

BRIEF DESCRIPTION OF THE FIGURES

The accompanying drawings, which are incorporated in and constitute a part of this specification, illustrate embodiments of the invention, and, together with the general description of the invention given above, and the detailed description of the embodiments given below, serve to explain the principles of the present invention.

DETAILED DESCRIPTION OF THE INVENTION

Figure 1:
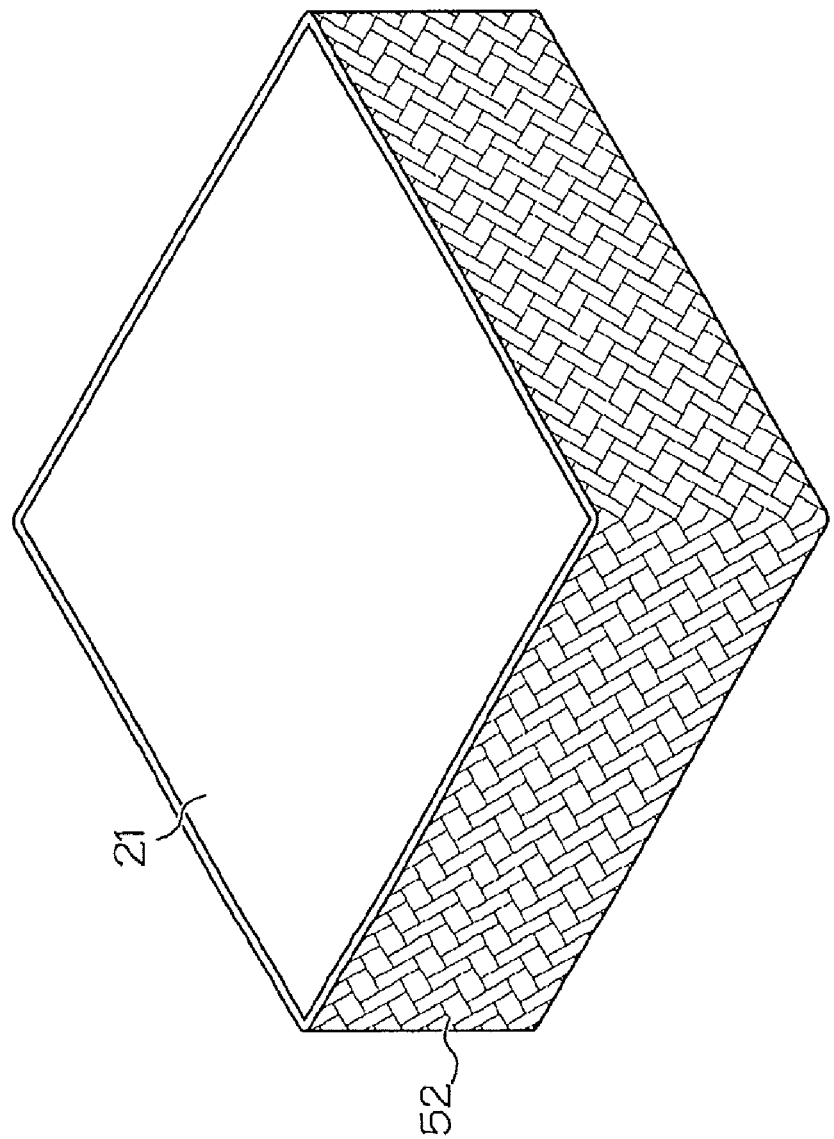
FIG. 1 is a perspective view of a ceramic tile (21) edge wrapped with a permeable medium (52).
Figure 2:
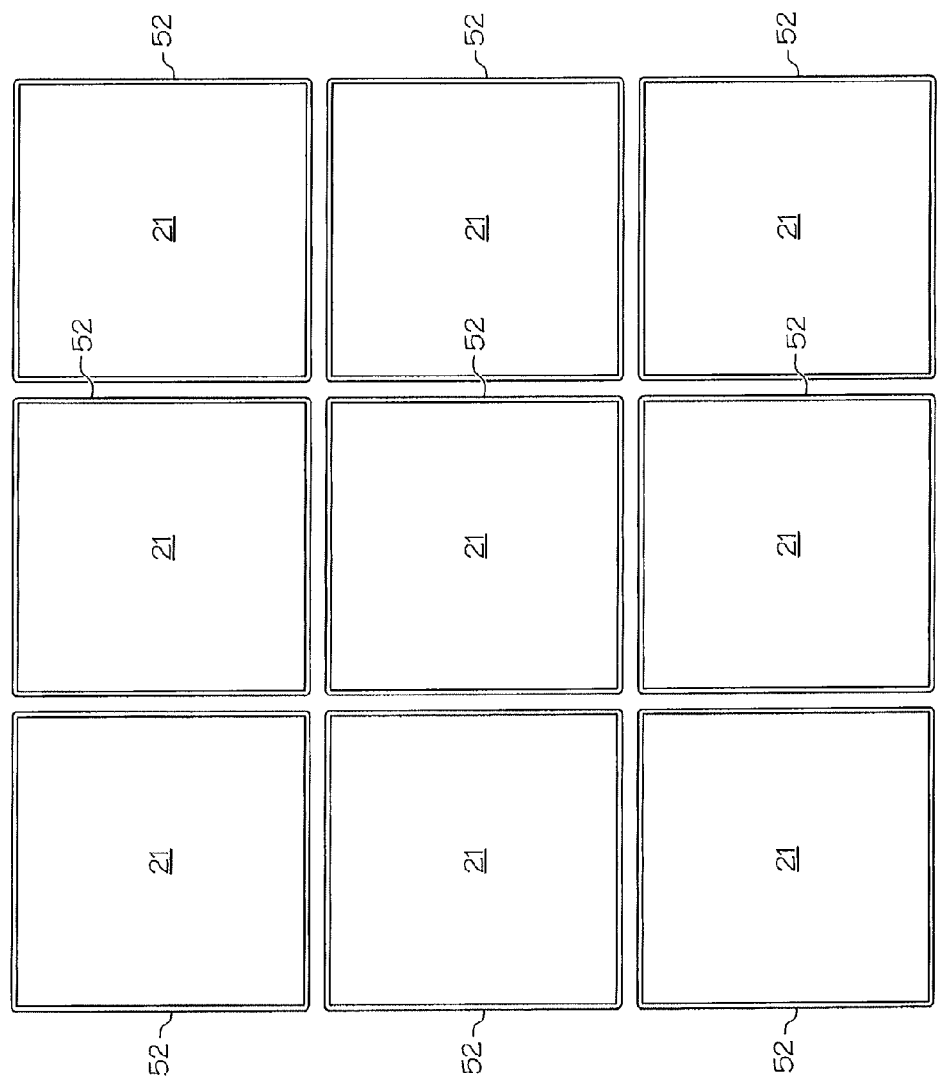
FIG. 2 is a top view of the ceramic tiles (21) in a 3×3 array.
Figure 3A:
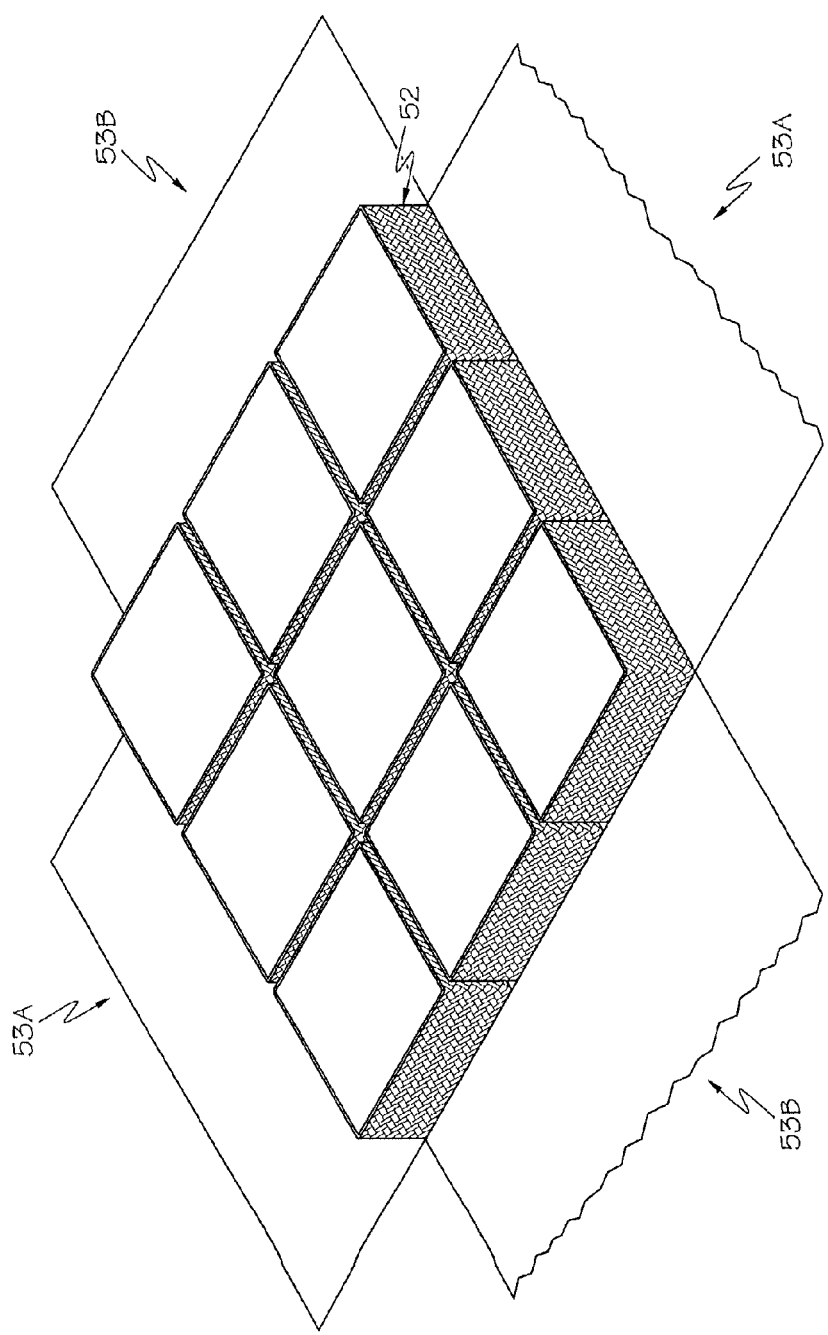
FIG. 3A is a perspective view of ceramic tiles (21) in a 3×3 array edge wrapped with a permeable medium (52), before being face wrapped by a permeable medium (53A and 53B) where the second face wrap will be wrapped perpendicular to the first wrap.
Figure 3B:
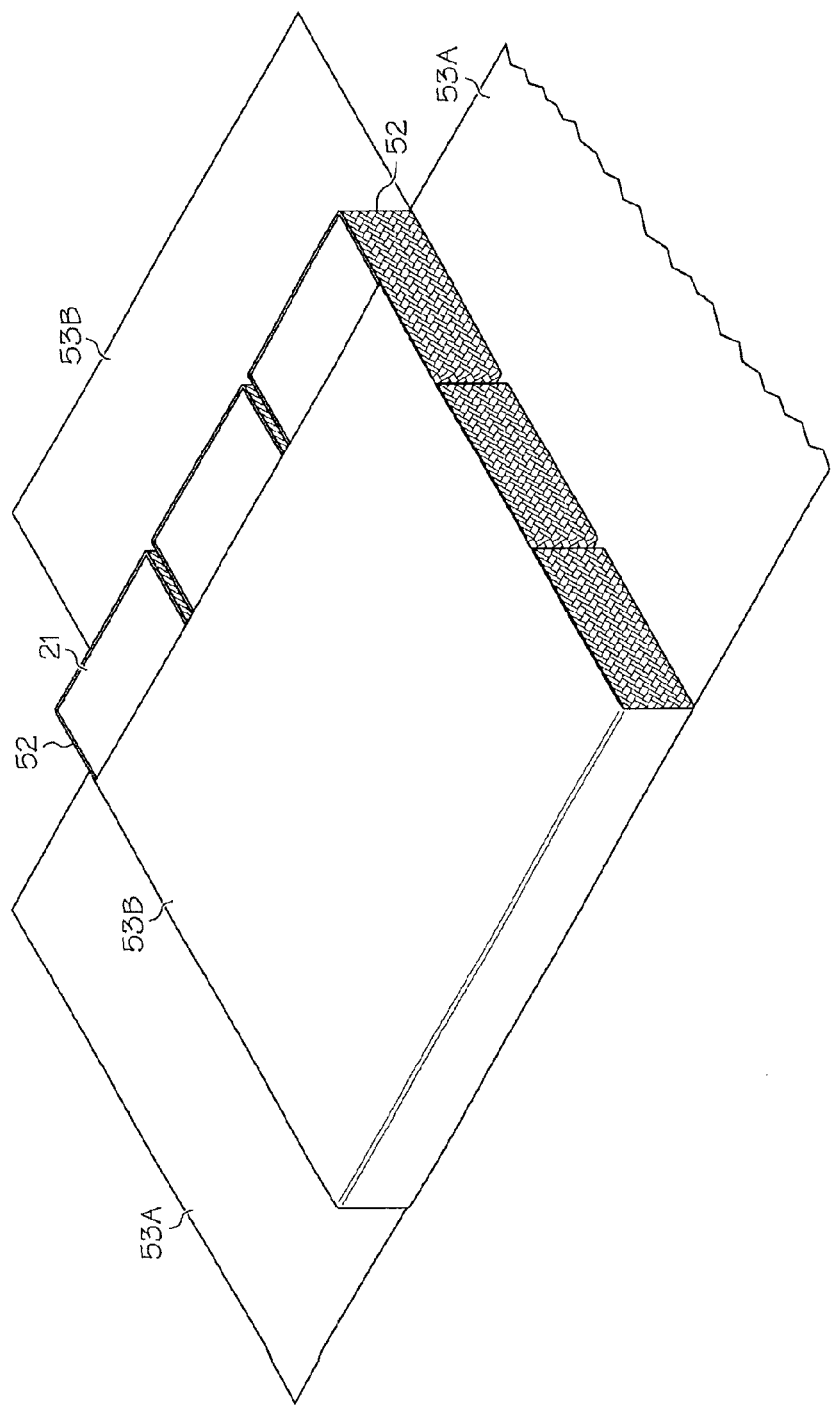
FIG. 3B is a perspective view of ceramic tiles (21) in a 3×3 array edge wrapped with a permeable medium (52), being face wrapped by a permeable medium (53B) where the second face wrap (53A) will be perpendicular to the first wrap.
Figure 3C:
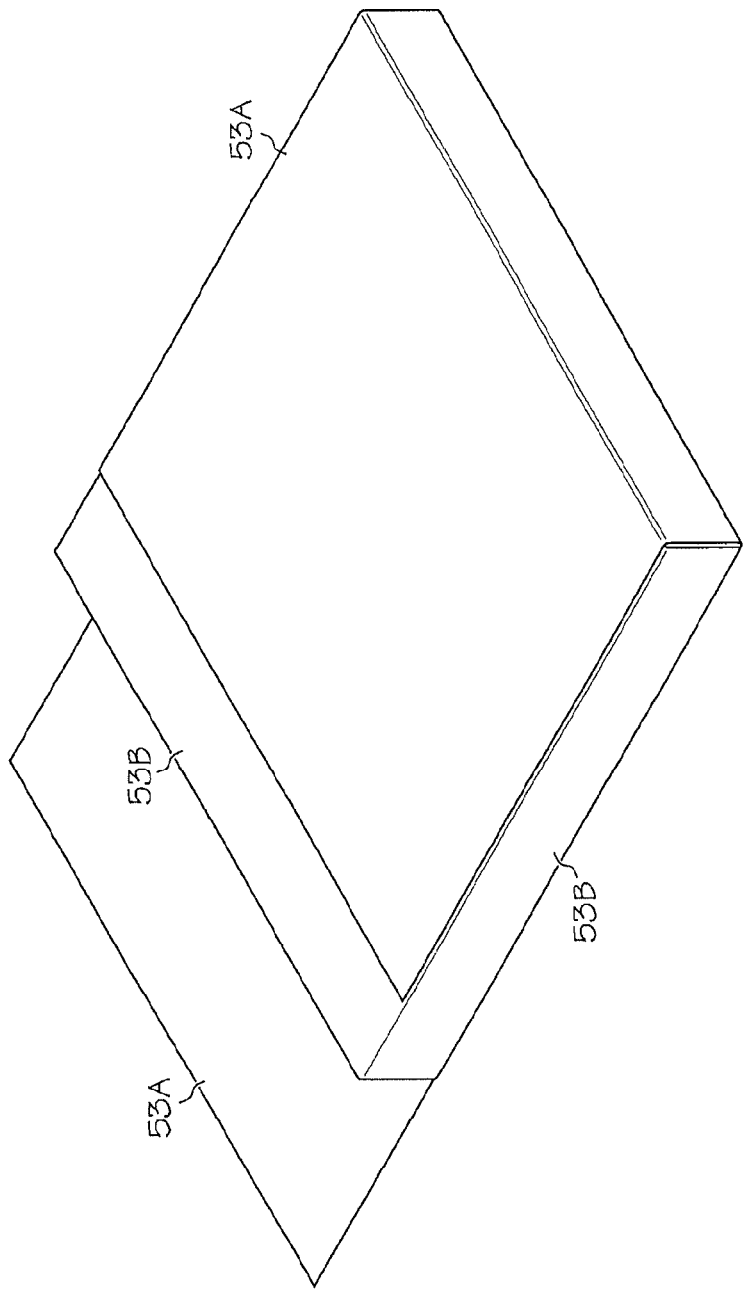
FIG. 3C is a perspective view of ceramic tiles (21) in a 3×3 array edge wrapped with a permeable medium (52) and face wrapped by a permeable medium (53B), being face wrapped by a second permeable medium (53A) perpendicular to the first wrap.
Figure 4:
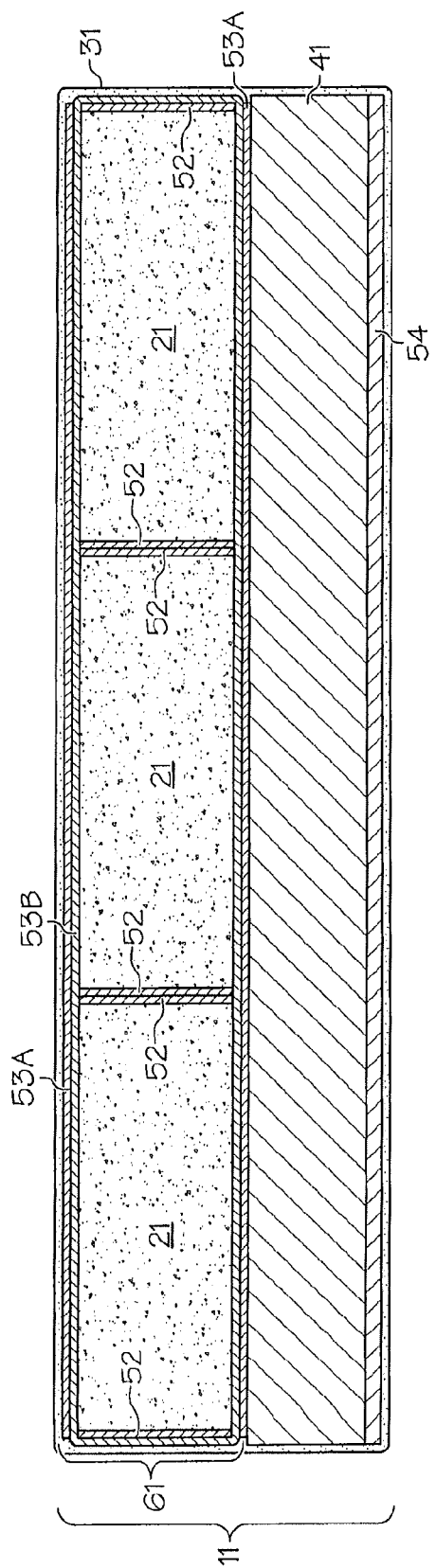
FIG. 4 is a sectional view of a composite armor panel (11) showing the ceramic tile (21), back plate (41), back plate reinforcing permeable medium (54), face-wrap permeable medium (53), edge-wrap permeable medium (52), hyperelastic polymer (31), and strike face (61).

The following description of certain examples of the invention should not be used to limit the scope of the present invention. Other examples, features, aspects, embodiments, and advantages of the invention will become apparent to those skilled in the art from the following description, which is by way of illustration, one of the best modes contemplated for carrying out the invention. As will be realized, the invention is capable of other different and obvious aspects, all without departing from the invention. Accordingly, the drawings and descriptions should be regarded as illustrative in nature and not restrictive.

The strike face (61) of the present invention comprises one or more ceramic tiles (21) individually wrapped with a permeable medium, and a hyperelastic polymer (31) permeating the permeable medium encapsulating the ceramic tiles (21).

When more than one ceramic tile (21) is used they may be arranged in different layouts. In one embodiment the ceramic tiles (21) may be layered, stacked, overlapped, imbricated, or arrayed along a common surface. The shape of the ceramic tile (21) may be polygonal such as square or rectangular or another shape and arrayed in a rectangular or other configuration. The ceramic tile (21) may be hexagonal or another shape and arrayed in a hexagonal, or other configuration. The ceramic tiles (21) may be spaced apart from neighboring ceramic tiles (21) or substantially in contact with the neighboring ceramic tiles (21).

The ceramic tiles (21) may be made from aluminum oxide, silicon carbide, aluminum nitride, and boron carbide, barium titanate, strotium titanate, calcium zirconate, magnesium zirconate, titanium diboride, silicon nitride, tungsten carbide, and metal-ceramic composites. These potential ceramic bases are not limited to oxide ceramics but also include mixed oxides, non-oxides, silicates, and ceramet (a metal-ceramic composite which contains at least one metal phase and at least one ceramic phase). Suitable ceramic composites have relatively high hardness and fracture toughness. Ultimately, hardness and fracture toughness levels will depend on the type of ceramic composite employed.

In certain instances, the ceramics employed may be supplemented by the addition of a toughening agent such as toughened metallic oxides. The inclusion of metallic oxides increases the strength of the resulting ceramic composite and the ability to resist disassociation of the disk upon impact during a ballistic event. Other possible ceramic composites may be suitable for the ceramic tiles (21), including fiber reinforced ceramics.

The ceramics are mixed in ways commonly known in the art. Casting or molding methods, including injection molding, to form the ceramic tiles (21) are well known in the art. In one embodiment, the ceramic tiles (21) may be formed by injection molding and then pressing to the desired shape and sintered.

The permeable medium is a porous material that allows infiltration of the liquid polymer resin. It may provide spacing of less than about 2 mm between the ceramic tiles (21) to allow the hyperelastic polymer (31) to form a good bond to the ceramic tiles (21). The permeable medium between the ceramic tiles (21) may improve impact damage response by reducing wave propagation, and isolating the ceramic tiles (21). By isolating the ceramic tiles (21) the hyperelastic polymer (31) and the permeable medium can prevent ceramic tiles (21) adjacent to a ballistic impact from being damaged by fragments of the ceramic tile (21) impacted.

An examples of a permeable medium is an organic polymer fiber such as: aramid, carbon, polyamide, polybenzamidazole, liquid crystal, polyester, main chain aromatic polyester, main chain aromatic polyesteramide, polyolefin, ultra-high molecular weight polyolefin, poly(p-phenylene-2,6-benzobisoxazole), and poly(pyridobisimidazole). The fiber may be a liquid crystal polyester-polyarylate. Examples of fibers include those sold under the names such as VECTRAN, TECHNORA, NOMEX, DYNEEMA, and M5. An alternative to an organic polymer permeable medium is an inorganic one. Examples of inorganic fibers that can be used as the permeable medium are: aluminum, magnesium, basalt, boron, glass, ceramic, quartz, silicon carbide, and steel. Other suitable fibers will occur to one of ordinary skill in the art. The permeable medium fibers may be used individually or woven to form a fabric.

The permeable medium may be wrapped around each ceramic tile (21) individually or around all the ceramic tiles (21). It can also be applied in any manner such as, for example, by spraying or dipping that results in a layer permeable to the infiltration of the liquid polymer resin. A method for wrapping the ceramic tiles (21) may comprise wrapping the thin edge, or perimeter, of the ceramic tile (21), called edge-wrapping. The permeable medium may be bonded to the ceramic tile (21). In one embodiment the permeable medium is used to wrap a ceramic tile (21) in a spiral fashion. The ceramic tile (21) may be wrapped by multiple fibers or fabrics of permeable medium in parallel, spiral, woven, or crossing fashion. The permeable medium may be wrapped around the perimeter where the head and tail of the permeable medium meet, and may or may not be joined. The ceramic tiles (21) may be wrapped with more than one type of permeable medium.

In one embodiment, the permeable medium is wrapped around the ceramic tiles (21) covering the face of the ceramic tiles (21). For example, a rectangular piece the permeable medium (53A) is wrapped around one ceramic tile (21), or an array of ceramic tiles (21). The permeable medium is bonded together with epoxy. A second rectangular piece of the permeable medium (53B) is then wrapped around the ceramic tile (21) or ceramic tiles (21) perpendicularly to the first fabric. The second fabric is then bonded together with epoxy. In another embodiment, multiple pieces of permeable medium fabric may be used to wrap the ceramic tiles (21), which may additionally be woven together as they are wrapped over the ceramic tiles (21). Other methods may be suitable for wrapping the ceramic tiles (21), including methods found in U.S. Pat. No. 4,911,061.

The ceramic tiles (21) may be wrapped with the permeable medium in both an edge wrap (52) and face wrap (53A and 53B) fashion. More than one type of permeable medium may be used for either or both of the edge wrap and face wrap.

Elastomers belong to a specific class of polymeric materials where their uniqueness is their ability to deform to at least twice their original length under load and then to return to near their original configuration upon removal of the load. Elastomers are isotropic, nearly incompressible materials which behave as linear elastic solids under low strains and low strain rates. As these materials are subjected to larger strains under quasistatic loading, they behave in a non-liner manner. This unique mechanical behavior is called hyperelasticity. Hyperelastic materials have the ability to do work by absorbing kinetic energy transferred from impact through an elastic deformation with little viscous damping, heat dissipation (from friction forces) or permanent deformation (i.e., permanent set). This mechanical energy can then be returned nearly 100% allowing the components to return to their original configuration prior to impact with negligible strain.

An added complexity to elastomers is their strain rate and strain history dependence under dynamic loading, which is called viscoelasticity. The viscoelastic nature of elastomers causes problems resulting in hysteresis, relaxation, creep and permanent set. Permanent set is when elastomers undergo a permanent deformation where the material does not return to zero strain at zero stress. This deformation however, tends to stabilize upon repeated straining to the same fixed strain. To further add to the complexity of the mechanical behavior of elastomers is the visco-hyperelastic response at high strain under dynamic loading, which is difficult to characterize and test. Often stress-strain data from several modes of simple deformation (i.e., tension, compression and shear) are required as input to material models, which predict their performance.

Traditionally, the viscous component of rubbers dominates under dynamic loading; whereby the strain rate dependence is accounted for by visco-hyperelastic models, where the static response is represented by a hyperelastic model (based on elastic strain energy potential) in parallel with a Maxwell model which takes into account strain rate and strain history dependent viscoelasticity.

The hyperelastic polymer (31) used herein is a novel energy absorbing material that behaves in a rate-independent hyperelastic manner. The hyperelastic polymer (31) behaves in a manner such that its permanent set is minimized so that it maintains consistent force-displacement characteristics over a wide range of impact velocities while remaining fully recoverable.

The hyperelastic polymer (31) behaves in a hyperelastic manner under dynamic loadings of high strain rates of up to about $10^4$ $s^{-1}$. The hyperelastic polymer (31) allows for direct impacts and also allows for the instantaneous recovery such that its permanent set is minimized. The hyperelastic polymer (31) has non-linear elastic responses in energy absorbing applications.

In one embodiment the hyperelastic polymer (31) is a polyurethane. The polyurethane may be formed from a mixture of an MDI-polyester or polyether prepolymer, at lease one long-chain polyester or polyether polyol, at least one short-chain diol, and a catalyst. Suitable polyester polyols can include, without limitation, polyglycol adipates, such as ethylene/butylene adipate, or polycaprolactones. Suitable polyether polyols can include, without limitation, polypropylene glycols, polyethylene glycols, polytetramethylene ether glycols, or combinations thereof. In one embodiment at least one long-chain polyester polyol comprises ethylene/butylene adipate diol. In another embodiment, at least one short-chain diol comprises 1,4-butanediol. In one embodiment the catalyst is a tin-based catalyst.

The MDI-prepolymer is typical an isocyanate-terminated product prepared by reaction of a molar excess of isocyanate groups (for example, present as a difunctional methylene diphenyl diisocyanate (MDI)) with a difunctional OH-terminated polyester or polyether polyol. Suitable polyester polyols can include, without limitation, polyglycol adipates, such as ethylene/butylene adipate, or polycaprolactones. Suitable polyether polyols can include, without limitation, polypropylene glycols, polyethylene glycols, polytetramethylene ether glycols, or combinations thereof. In one embodiment the difunctional OH-terminated polyester used is a poly(ethylene-butylene) adipate ester, and the MDI-prepolymer has an average molecular weight of 450-500 with a distribution of molecular length species including free (completely unreacted) MDI monomer. An example of such a MDI-prepolymer is BAYTEC GSV ISO.

In one embodiment the hyperelastic polymer (31) is formed from a mixture of an MDI-polyester or polyether prepolymer having a free isocyanate content of about 5-25%, at least one long-chain polyester or polyether polyol comprising ethylene/butylene adipate diol with an OH# of about 25-115, at least one short-chain diol that accounts for about 10-20% by weight of the total hydroxyl-containing components of the mixture, and at least one catalyst comprised of a tertiary amine catalyst and a tin-based catalyst in a ratio of about 1:1 to 10:1, wherein the total catalyst loading is about 0.020-0.030% by weight, the reactive components are combined in a proportion that provides about 1-10% excess of isocyanate groups in the total mixture.

In one embodiment, the strike face (61) is formed by molding and a total catalyst loading used is such that the mold is filled entirely before the material begins gelling. This level of reactivity allows ample pour time and minimizes de-mold time during manufacture. In certain embodiments, the chemical reactivity can be adjusted by changing the amount of catalyst in the system. For the purposes of this application the term resin is used to mean the materials used to form the polymer after they have been mixed but before they have gelled.

In one embodiment the MDI-polyester or polyether prepolymer has a free isocyanate content of approximately 19%.

In one embodiment the short-chain diol accounts for approximately 18% by weight of the total hydroxyl-containing components. An example of the short-chain diol is 1,4-butanediol.

In one embodiment the long-chain polyester or polyether polyol used to form the MDI-prepolymer or the hyperelastic polymer (31) has an OH# of 35 to 80. In one embodiment the long-chain polyester or polyether polyol has an OH# of 56. Example of the long-chain polyester polyol is one having a molecular weight of approximately 2000, and BAYTEC GSV polyol.

In one embodiment the tin-based catalyst is a delayed-action heat-activated type with a deblocking temperature near the exotherm temperature of the reaction mixture. Such a catalyst allows the desired combination of maximum work time and short demold times. In one embodiment at least one catalyst comprised of a tertiary amine catalyst and a tin-based catalyst in a ratio of about 4:1

In one embodiment the reactive components are combined in a proportion that provides about 5% excess of isocyanate groups in the total mixture In one embodiment the hyperelastic polymer (31) comprises at least one energy absorbing material that has at least the properties of: a Shore A hardness value of at least about 90, elongation at break above about 400% and more preferably ranging from about 500 to about 700%, and Young's modulus ranging from about 4000 to about 6000 psi; and at least withstands: strain rates of up to at least about $10^4\,s^{-1}$, and tensile stresses ranging from at least about 4000 to at least about 7000 psi.

The hyperelastic polymer (31) aids in energy management by reducing energy reflection and lateral displacement of fragments and containing the ceramic fragments. It also allows load transfer and wave propagation through the thickness of the armor panel, spreading over the back plate (41). The polymer's dynamic mechanical properties allow the back plate (41) to deform but not delaminate.

The ceramic tiles (21) may be attached to a back plate (41) to form a composite armor panel (11) in three different ways. In one embodiment the ceramic tiles (21) are adhered to a back plate (41) with the hyperelastic polymer (31). In another embodiment the strike face (61) and the back plate (41) are encapsulated together in the hyperelastic polymer (31) to form a composite armor panel (11). In another embodiment the strike face (61) may be attached directly to a structure, where the structure acts as a back plate (41). For example, the strike face (61) may be used to provide ballistic protection to a vehicle, and is directly attached to the vehicle, so a part of the vehicle acts as the back plate (41).

The back plate (41) may be comprised of a metal, metal alloy, or composite material. Examples of materials that may be used for a back plate (41) are aluminum metal, aluminum alloy, and magnesium alloy. The back plate (41) may be made of a foam, honeycomb, or corrugated construction. In one embodiment the back plate (41) behaves in a ductile manner at strain rates up to about $10^4\,s^{-1}$. The back plate (41) may also be reinforced with the permeable medium previously described. The permeable medium may be located between the back plate (41) and the ceramic tiles (21), on the side of the back plate (41) opposite the ceramic tiles (21), it may wrap the ceramic tiles (21) and the back plate (41), it may wrap the back plate (41) entirely, or it may reinforce the back plate (41) in other ways. Multiple layers of fabric may be used to reinforce the back plate (41). The back plate (41) may be made from multiple layers of metal, metal alloy, or composite material. The permeable medium, hyperelastic polymer (31), or both may be between multiple layers of a back plate (41).

In one embodiment the thickness of the hyperelastic polymer (31) between the back plate (41) and the ceramic tiles (21) is less than 2 mm in thickness. The adhesive bond of the hyperelastic polymer (31) plays a role in the ballistic properties of the armor panel. The hyperelastic polymer (31) transmits and reflects the impact energy. A compressive stress wave is created on ballistic impact and propagates through the armor plate. Upon reaching the rear face of the ceramic tile (21), it is partially reflected as a tensile stress wave facilitating movement of the fractured material. The additional reflection of stress waves from the rear of the backing plate is tensile in nature and is responsible for delamination of the back plate (41) from the ceramic. It has been found that increasing the adhesive layer thickness reduces the magnitude of the interlaminar tensile stress. The peak tensile stress has also been found to decrease with adhesive thickness irrespective of impact velocity.

The strike face (61) may be manufactured by covering the ceramic tiles (21) with the permeable medium, then alternately placing the covered ceramic tiles (21) into a mold and pouring the hyperelastic polymer resin into the mold. Another method of manufacturing involves covering the ceramic tiles (21) with the permeable medium, then filling a mold with the covered ceramic tiles (21) and injecting the polymer resin through reaction injection molding (RIM). Either of these techniques may additionally include the back plate (41). Persons knowledgeable in the art may conceive of other methods of manufacturing the strike face (61) or the composite armor.

The permeable medium, the ceramic tiles (21), and the back plate (41) may all be chosen such that their different coefficients of thermal expansion allow compression stress to additionally strengthen the strike face (61) or composite armor. Using such materials may allow the hyperelastic polymer (31) to contract during cooling to a greater extent than the ceramic tiles (21) thereby creating the internal compressive stress in the ceramic tiles (21).

EXAMPLES

Example 1

Manufacturing Composite Armor Panel

Process for cleaning ceramic tiles (21):
1) The ceramic tiles (21) were cleaned along all six surfaces via a mechanical blasting process using Aluminum Oxide media across the entirety of the surfaces.
2) The ceramic tiles (21) were further cleaned in a solvent to remove residual dust, oils, and other contaminants not removed completely by the blasting process.

Process for edge wrapping ceramic tiles (21):
1) The ceramic tiles (21) were loaded onto a winding mandrel and the liquid crystal polyester-polyarylate fiber was wrapped around the 8 mm-thickness edge of the ceramic tiles (21).
2) The liquid crystal polyester-polyarylate fiber was wound in the following manner: Three rows of three liquid crystal polyester-polyarylate HT1500/300/T150 yarn, epoxied at corners (61.26% Epon Resin 828, 26.24% Epodil 757 and 12.50% Epi-Cure 3200), gapped (three tows per edge) single edge wrapped.
3) The epoxy was allowed to cure for 24 hours at 23° C. Elevated temperatures can be used to accelerate this cure time, or faster curing epoxy systems can be used. Other adhesive systems would also work well such as cyanoacrylate adhesives, ultraviolet light curable adhesives, and urethane adhesives.

Process for manufacturing the 3×3/0/90 degree wrap kit:
1) One swatch of 12"×26" to 27" liquid crystal polyester-polyarylate T9-988 fabric was placed centrally over a pre-manufactured jig of approximately 12⅜" sq. dimension. The jig was a thin, sheet metal pan with the edges bent up to form a short ¼"-⅜" high lip around (3) sides. The bends were placed so as to make approximately 12⅜" internal square with one side left open to allow evacuation of the assembly.
2) Edge wrapped 100 mm×100 mm×8 mm ceramic tiles (21) were placed into a tight 3×3 array onto the liquid crystal polyester-polyarylate fabric laid up in the jig.
3) A release paper ~2"/3" wide was placed over the full length of the ceramic tiles (21) in the direction of the fabric fold
4) The excess liquid crystal polyester-polyarylate fabric was tightly folded over the ceramic tiles (21) and the release paper from each side of the assembly. The liquid crystal polyester-polyarylate fabric was sparingly epoxied in several small spots along the ~1" wide resulting overlap using the above mentioned epoxy.
5) The epoxy was cured long enough for handling and then the release paper was removed.
6) The second 12"×26" to 27" swatch of liquid crystal polyester-polyarylate T9-988 fabric was centrally placed over a second pre-manufactured jig as described above.

7) The previous partially cured 3×3 tile/liquid crystal polyester-polyarylate (single ply) wrap array was slid onto the second liquid crystal polyester-polyarylate fabric/jig rotated 90 degrees from the first liquid crystal polyester-polyarylate fabric. Steps 3-5 were repeated for the second 90 degree ply wrap 8) The epoxy was allowed to cure for 24 hours at 23° C. Elevated temperatures can be used to accelerate this cure time, or faster curing epoxy systems can be used. Other adhesive systems would also work well such as cyanoacrylate adhesives, ultraviolet light curable adhesives, and urethane adhesives.

Composition of the hyperelastic polymer (31):

1) The hyperelastic polymer (31) was prepared using an MDI-polyester prepolymer having a free isocyanate content of approximately 19%. A separate long chain polyester polyol component based on ethylene/butylene adipate was utilized. The polyol had an OH# of approximately 56. The short-chain diol utilized was 1, 4-butanediol and accounted for approximately 18% by weight of the total hydroxyl-containing components of the mixture.

2) Reactive components were combined in a proportion that provided approximately 5% excess of isocyanate groups in the total mixture. A catalyst package was utilized which facilitated the chemical reaction of the components and allowed demold of the parts within a reasonable time frame. The catalyst system contained a blend of a tertiary amine catalyst and a tin-based catalyst. A 4:1 weight ratio of the amine component to the tin component provided desirable processing characteristics. A total catalyst loading of 0.026% by weight was used to provide a gel time of approximately 2.25-2.50 minutes.

Process for manufacturing composite armor panel (11):

1) A three component liquid casting machine equipped with a precision gear pump to accurately meter components and a dynamic mix head to obtain adequate mix quality and heating capability was used. The prepolymer, long chain polyol and short-chain diol reactive components were charged into holding tanks heated to approximately 43° C. Approximate amounts of the catalyst components were added to the tank containing the short chain diol and mixed thoroughly. All components were then degassed.

2) A mold of dimensions roughly 16" square by 1" deep having a depression centrally of approximately 12½"× 12½"×¾" deep and a rigid mold lid of roughly 12⅜" square with means of providing a clamping force between the lid and the mold for compression of the composite armor panel (11) was required.

3) The mold and the aluminum back plate (41) (single part or multi-part composite) were heated to an approximate range of 88° C. to 100° C. prior to dispensing the hyperelastic polymer resin into the mold cavity.

4) Approximately 1 to 1.5 lbs. of cast urethane was dispensed from the casting machine into the 12½" square mold cavity covering the entire mold bottom surface with approximately ⅛" to 3/16" deep of the cast urethane material.

5) The previously described 3×3/0/90 degree liquid crystal polyester-polyarylate kit was carefully slid into the mold cavity by means of a formed sheet metal tray similar to the above mentioned jig used for making the kits.

6) A scraper was employed to press and push the kit down into the polymer resin. This allows the liquid urethane underneath to work its way up and through the liquid crystal polyester-polyarylate weave and also through the narrow edge gaps formed by ceramic tiles (21) that are placed adjacent to each other in the kit, and thoroughly wet all the liquid crystal polyester-polyarylate weave.

7) Urethane material was smoothed out and worked down into the composite until approximately 1/16" of urethane material was evenly distributed over and above the top surface of the liquid crystal polyester-polyarylate fabric when all components were completely saturated.

8) The aluminum back plate (41) was placed into the mold cavity, and a scraper was employed to gently push the plate down into the urethane to evacuate any large air pockets that may have been trapped.

9) A small amount of additional urethane was dispensed from the casting machine and cast onto the top of aluminum back plate (41) to cover the plate in approximately 1/16" of urethane material.

10) A liquid crystal polyester-polyarylate back plate reinforcing panel (12⅜" sq.) was laid into the mold on top of the smoothed out urethane. Carefully, the cast urethane material was worked up through the weave by using a flat scraper.

11) The lid was placed on the assembly and clamped down to evacuate all of the excess urethane material. The clamping force was sufficient to force the extra urethane in and between all layers of the composite armor panel (11), and up and out of the mold. A gap space of approximately 1/16" around the perimeter between the mold lid edge and the mold cavity edge was used for the evacuation of these materials.

12) The mold temperature was maintained at about 93° C. during and after the process to ensure proper pre-cure of the material prior to demolding the part. The part was demolded after approximately 20-30 minutes and subsequently post-cured at temperatures between about 93° C. to 121° C. for approximately 12 to 36 hours to ensure completion of the chemical reaction and attainment of material properties.

Example 2

Comparison Armor Panel

A composite armor panel was made according to procedure in Example 1, except the hyperelastic polymer (31) was substituted with a non-hyperelastic polymer shown below.

A polymer resin was formed from an MDI-terminated prepolymer with a polypropylene glycol backbone (Baytec MP-210), 1,4-butanediol (a short-chain curative), an ethylene-glycol capped polypropylene glycol triol with a molecular weight of approximately 6000 (Mutranol 3901), and a catalyst system containing a 4:1 blend of a tertiary amine catalyst and a tin-based catalyst. The ingredients were degassed, mixed at room temperature, and poured into a hot mold to make a composite armor panel. The panel was allowed to cure in the mold at a temperature of about 93° C. to 110° C. for a minimum of 30 minutes before being removed from the mold and post-cured.

Example 3

Ballistic Test

Testing of Example 1 and 2 armor panels was performed to NIJ Level IV standards with a 7.62 mm AP M2 at ~2,850 fps. After the test the panels were examined and it was found that the back plate delaminated from the strike face of the Example 2 armor panel, while the back plate did not delaminate from the strike face of the Example 1 armor panel.

While the present invention has been illustrated by description of several embodiments and while the illustrative embodiments have been described in considerable detail, it is not the intention of the applicant to restrict or in any way limit the scope of the appended claims to such detail. Additional advantages and modifications may readily appear to those skilled in the art.

What is claimed is:

1. An armor strike face comprising, one or more ceramic tiles having tile faces and tile edges, a layer of a permeable medium substantially covering the ceramic tile faces and a hyperelastic polymer permeating the permeable medium, bonded to the tile faces and substantially encapsulating the tiles, wherein the hyperelastic polymer is a polyurethane formed from a mixture of an MDI-polytetramethylene polyether prepolymer, at least one long-chain polyester or polyether polyol, at least one short-chain diol, and a catalyst.

2. The strike face of claim 1, wherein more than one ceramic tiles are arrayed along a common surface.

3. The strike face of claim 1, wherein the ceramic tiles are arrayed in a polygonal configuration.

4. The strike face of claim 1, wherein the shape of the ceramic tiles is rectangular or hexagonal.

5. The strike face of claim 1, wherein the ceramic tile edges are substantially covered by a layer of a permeable medium.

6. The strike face of claim 1, wherein the ceramic tiles are selected from aluminum oxide, silicon carbide, aluminum nitride, boron carbide, barium titanate, strontium titanate, calcium zirconate, magnesium zirconate, titanium diboride, silicon nitride, tungsten carbide, and metal-ceramic composites.

7. The strike face of claim 1, wherein the permeable medium is an organic polymer.

8. The strike face of claim 7, wherein the permeable medium is selected from aramid, carbon, polyamide, polybenzamidazole, liquid crystal, polyester, main chain aromatic polyester, main chain aromatic polyesteramide, polyolefin, ultra-high molecular weight polyolefin, poly(p-phenylene-2, 6-benzobisoxazole), and poly(pyridobisimidazole).

9. The strike face of claim 7, wherein the permeable medium is a liquid crystal polyester-polyarylate.

10. The strike face of claim 1, wherein the permeable medium is inorganic.

11. The strike face of claim 10, wherein the permeable medium is selected from alumina, aluminum, magnesium, titanium, basalt, boron, glass, ceramic, quartz, silicon carbide, and steel.

12. The strike face of claim 1, wherein the hyperelastic polymer is formed from a mixture of an MDI-polytetramethylene polyether prepolymer, at least one long-chain polyester or polyether polyol comprising ethylene/butylene adipate diol, at least one short-chain diol comprising 1,4-butanediol, and a catalyst.

13. The strike face of claim 12, wherein the hyperelastic polymer behaves in a hyperelastic manner at strain rates up to about $10^4$ $s^{-1}$.

14. The strike face of claim 1, wherein the hyperelastic polymer is formed from a mixture of an MDI-polytetramethylene polyether prepolymer having a free isocyanate content of about 5-25%,
at least one long-chain polyester or polyether polyol comprising ethylene/butylene adipate diol with an OH# of about 25-115,
at least one short-chain diol comprising 1,4-butanediol that accounts for about 10-20% by weight of the total hydroxyl-containing components of the mixture, and
at least one catalyst comprised of a tertiary amine catalyst and a tin-based catalyst in a ratio of about 1:1 to 10:1, wherein the total catalyst loading is about 0.02-0.03% by weight,
the mixture is formed in a proportion that provides about 5% excess of isocyanate groups in the total mixture.

15. The strike face of claim 1, wherein the hyperelastic polymer is formed from a mixture of an MDI-polytetramethylene polyether prepolymer having a free isocyanate content of about 19%,
at least one long-chain polyester or polyether polyol comprising ethylene/butylene adipate diol with an OH# of about 56,
at least one short-chain diol comprising 1,4-butanediol that accounts for about 18% by weight of the total hydroxyl-containing components of the mixture, and
at least one catalyst comprised of a tertiary amine catalyst and a tin-based catalyst in a ratio of about 4:1, wherein the total catalyst loading is about 0.026% by weight,
the mixture is formed in a proportion that provides about 5% excess of isocyanate groups in the total mixture.

16. The strike face of claim 1, wherein the hyperelastic polymer comprises at least one energy absorbing material that has an elongation at break ranging greater than about 400%.

17. The strike face of claim 1, wherein the hyperelastic polymer comprises at least one energy absorbing material that has at least the properties of: a Shore A hardness value of at least about 90, elongation at break ranging from about 500 to about 700%, and Young's modulus ranging from about 4000 to about 6000 psi; and at least withstands: strain rates of up to at least about $10^4$ $s^{-1}$, and tensile stresses ranging from at least about 4000 to at least about 7000 psi.

18. The strike face of claim 1, wherein the hyperelastic polymer comprises an energy absorbing material that behaves in a rate-independent hyperelastic manner wherein its permanent set is minimized so that the energy absorbing material maintains consistent force-displacement characteristics over a wide range of impact velocities while remaining fully recoverable.

19. The strike face of claim 1, wherein the hyperelastic polymer adheres the one or more ceramic tiles to a back plate, to form a composite armor panel.

20. The composite armor panel of claim 19, wherein the back plate and the one or more ceramic tiles are encapsulated together in the hyperelastic polymer.

21. The composite armor panel of claim 19, wherein the back plate comprises a metal or metal alloy.

22. The composite armor panel of claim 19, wherein the back plate is aluminum.

23. The composite armor panel of claim 19, wherein the back plate behaves in a ductile manner at strain rates up to about $10^4$ $s^{-1}$.

24. The composite armor panel of claim 19, wherein the back plate is reinforced with permeable medium.

25. The composite armor panel of claim 19, wherein the thickness of the hyperelastic polymer between the back plate and the ceramic tiles is less than 2 mm in thickness.

26. The strike face of claim 19, wherein the hyperelastic polymer comprises an energy absorbing material that behaves in a rate-independent hyperelastic manner wherein its permanent set is minimized so that the energy absorbing material maintains consistent force-displacement characteristics over a wide range of impact velocities while remaining fully recoverable.

27. A method of making a strike face comprising, substantially covering one or more ceramic tiles with a layer of a permeable medium, and substantially encapsulating the tiles and permeable medium in a hyperelastic polymer which permeates the permeable medium and bonds to the ceramic tiles, wherein the hyperelastic polymer is a polyurethane formed from a mixture of an MDI-polytetramethylene polyether prepolymer, at least one long-chain polyester or polyether polyol, at least one short-chain diol, and a catalyst.

28. The method of making a strike face of claim 27, wherein the hyperelastic polymer adheres the one or more ceramic tiles to a back plate, to form a composite armor panel.

29. A method of making a composite armor panel comprising:
   (A) providing an array of ceramic tiles having substantially parallel tile faces,
   (B) substantially covering the faces of the ceramic tiles with a layer of a permeable medium,
   (C) applying a backing plate to one side of the ceramic tile faces in contact with at least a portion of the permeable medium,
   (D) infiltrating the permeable medium with a liquid polymer so as to substantially encapsulate the ceramic tile and the backing plate,
   (E) curing the liquid polymer into a hyperelastic, energy-absorbing material and bonding it to the ceramic tiles and the backing plate,
   wherein the liquid polymer and the curing are chosen such that the hyperelastic, energy-absorbing material behaves in a rate-independent hyperelastic manner wherein its permanent set is minimized and so that the energy-absorbing material maintains consistent force-displacement characteristics over a wide range of impact velocities while remaining fully recoverable, wherein the hyperelastic polymer is a polyurethane formed from a mixture of an MDI-polytetramethylene polyether prepolymer, at least one long-chain polyester or polyether polyol, at least one short-chain diol, and a catalyst.

* * * * *